United States Patent
Kunitomo et al.

(10) Patent No.: US 11,565,323 B2
(45) Date of Patent: Jan. 31, 2023

(54) METHOD OF MOLDING ANISOTROPIC COMPOSITE MATERIAL AND DIE USING ANISOTROPIC COMPOSITE MATERIAL

(71) Applicant: HITACHI, LTD., Tokyo (JP)

(72) Inventors: Kenichiro Kunitomo, Tokyo (JP); Osamu Ikeda, Tokyo (JP); Tomotake Touhei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 16/874,868

(22) Filed: May 15, 2020

(65) Prior Publication Data

US 2020/0384533 A1 Dec. 10, 2020

(30) Foreign Application Priority Data

Jun. 4, 2019 (JP) .............................. JP2019-104648

(51) Int. Cl.
*B22F 10/20* (2021.01)
*B33Y 10/00* (2015.01)
(Continued)

(52) U.S. Cl.
CPC ............... *B22F 10/20* (2021.01); *B22F 5/00* (2013.01); *B22F 2005/002* (2013.01); *B22F 2202/11* (2013.01); *B22F 2301/10* (2013.01); *B33Y 10/00* (2014.12); *B33Y 70/00* (2014.12); *B33Y 80/00* (2014.12)

(58) Field of Classification Search
CPC .. B22F 10/22; B22F 2301/10; B22F 2301/35; B23K 35/302; B23K 35/3093; C22C 33/0278
See application file for complete search history.

(56) References Cited

U.S. PATENT DOCUMENTS

2009/0001058 A1* 1/2009 Lentz ................. B23K 26/3584
219/121.61
2010/0034982 A1 2/2010 Fuwa
(Continued)

FOREIGN PATENT DOCUMENTS

JP 2008-156701 A1 7/2008
JP 2016-211062 A 12/2016

OTHER PUBLICATIONS

Dai, Xiaoqin, et al. "Microstructure evolution of phase separated Fe—Cu—Cr—C composite coatings by laser induction hybrid cladding." Surface and Coatings Technology 324 (2017): 518-525 (Year: 2017).*

(Continued)

*Primary Examiner* — Anthony J Zimmer
*Assistant Examiner* — Sean P. O'Keefe
(74) *Attorney, Agent, or Firm* — Volpe Koenig

(57) ABSTRACT

Provided is a method of molding a composite material by laser metal deposition in which a powder metal material is irradiated with a laser beam while supplying the powder metal material onto a surface of a base material, in which the powder metal material is a mixed powder of an Fe alloy powder and a Cu powder, and a mixing ratio of the Fe alloy powder and the Cu powder is 15% or more and 30% or less by weight % of the Cu powder, and in which the composite material having anisotropy is molded by setting energy of the laser beam to be 9 KJ/g or more and 10 KJ/g or less in a mixed powder ratio.

4 Claims, 11 Drawing Sheets

(51) Int. Cl.
*B33Y 70/00* (2020.01)
*B22F 5/00* (2006.01)
*B33Y 80/00* (2015.01)

(56) References Cited

U.S. PATENT DOCUMENTS

2016/0332227 A1 11/2016 Ryusuke et al.
2020/0199698 A1* 6/2020 Zeng ................. C21D 1/09

OTHER PUBLICATIONS

Imran, M. Khalid, S. H. Masood, and Milan Brandt. "Bimetallic dies with direct metal-deposited steel on Moldmax for high-pressure die casting application." The International Journal of Advanced Manufacturing Technology 52.9 (2011): 855-863. (Year: 2011).*
Prashanth, K. K., K. Chattopadhyay, and J. Majumder. "An investigation on the laser surface alloying of copperon iron." Journal of materials science 34.14 (1999): 3437-3445 (Year: 1999).*
Japanese Office Action dated Aug. 30, 2022 for Japanese Patent Application No. 2019-104648.

* cited by examiner

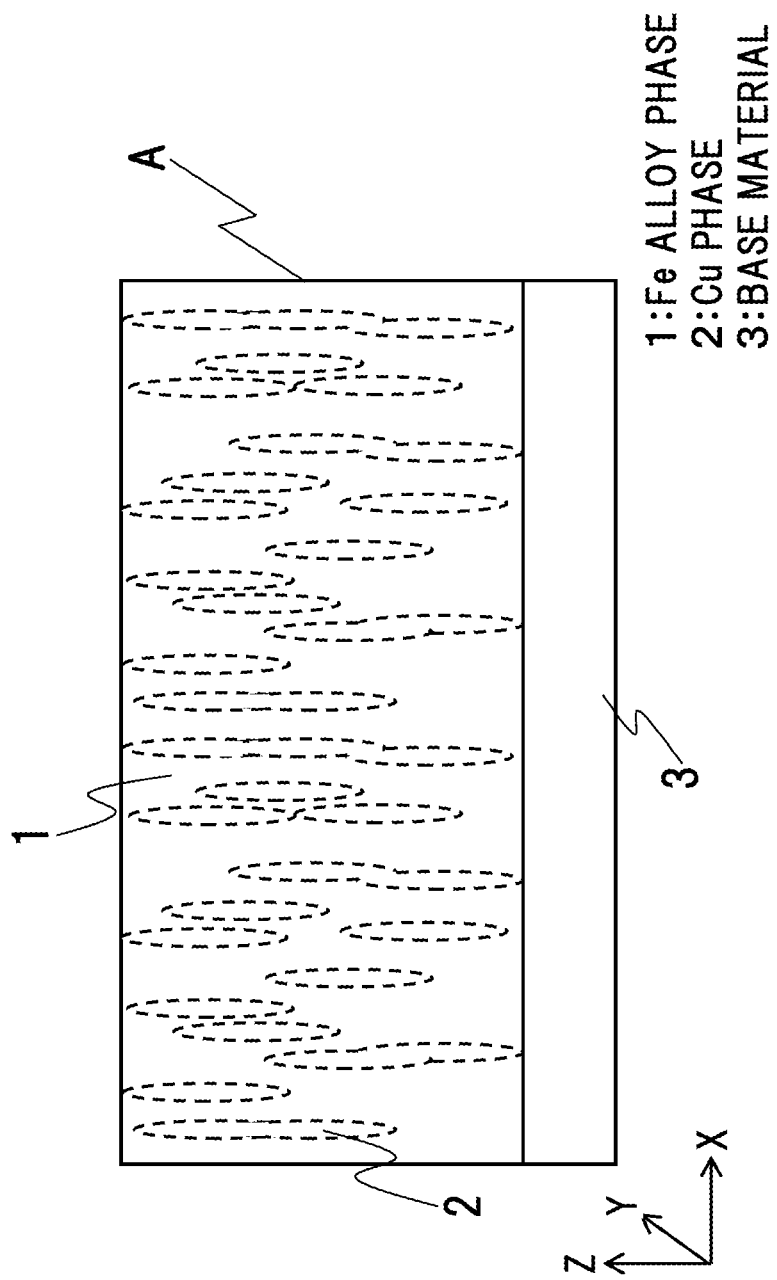

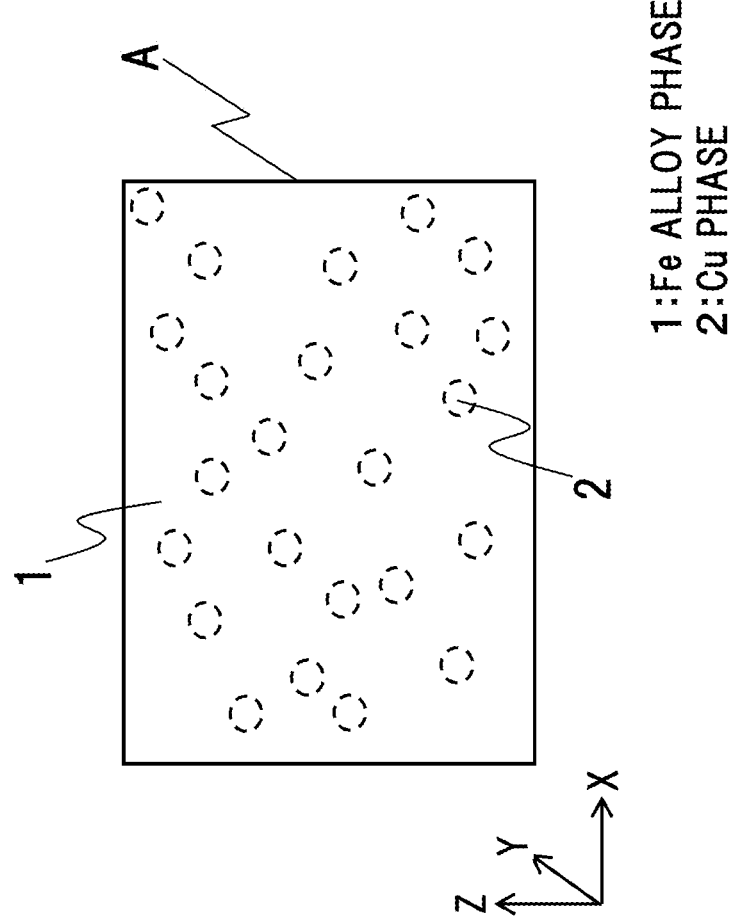

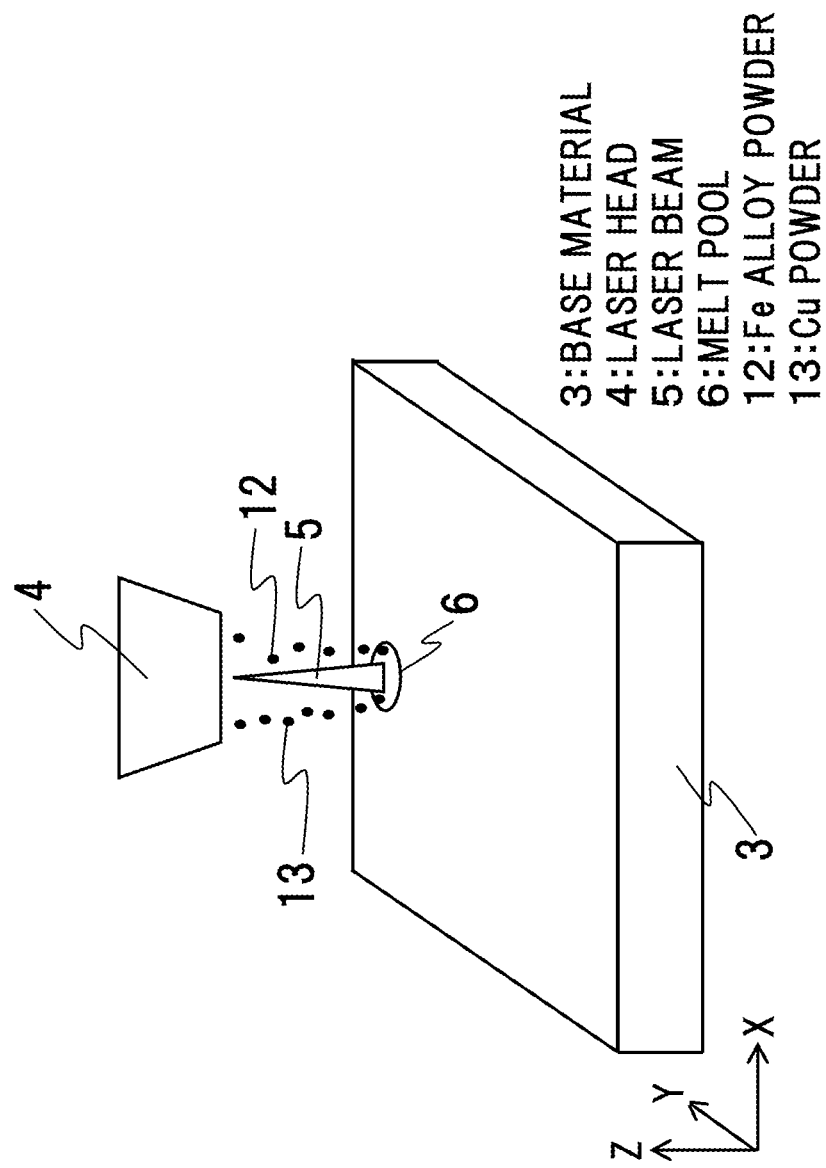

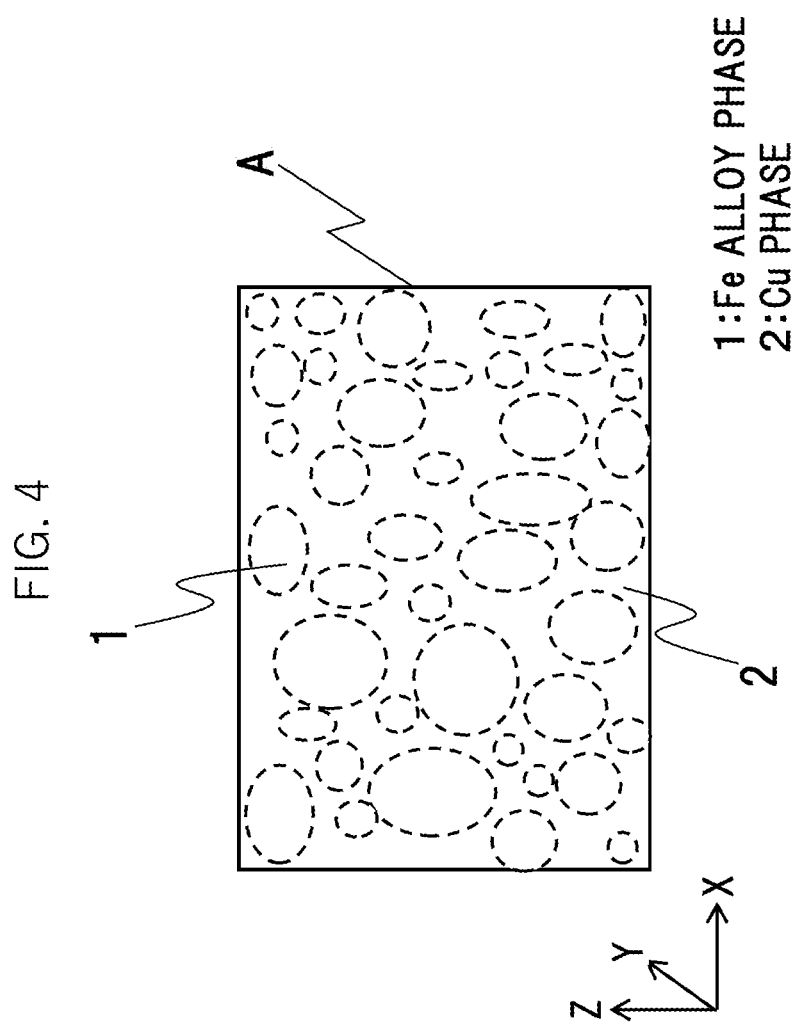

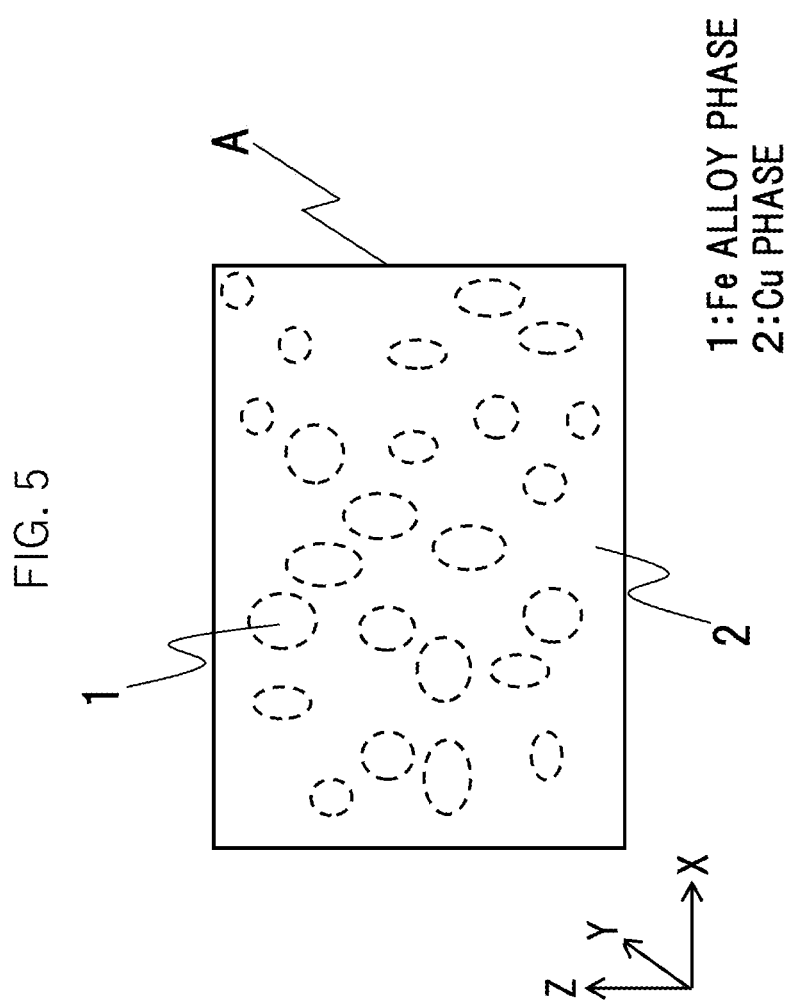

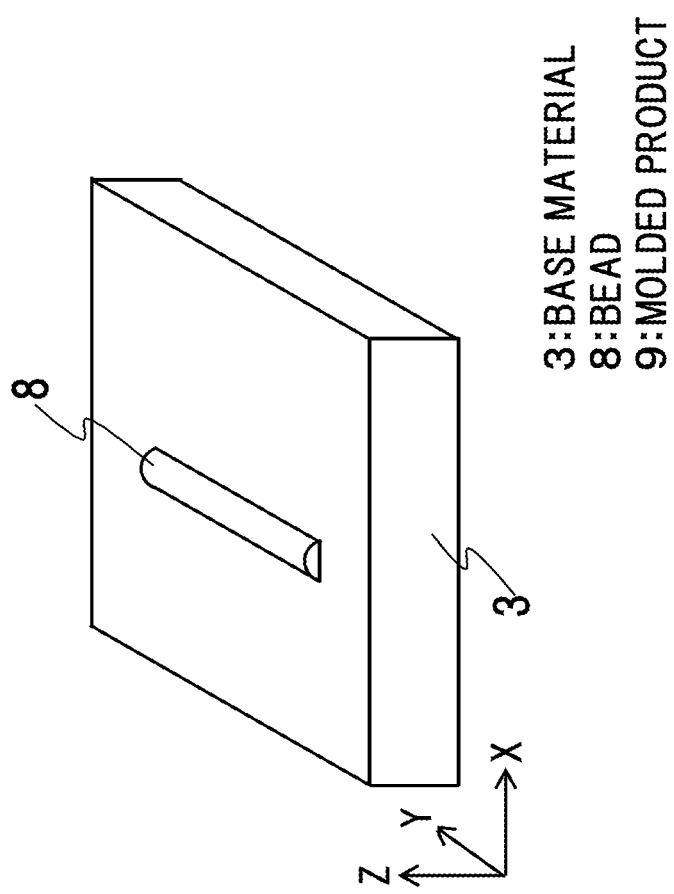

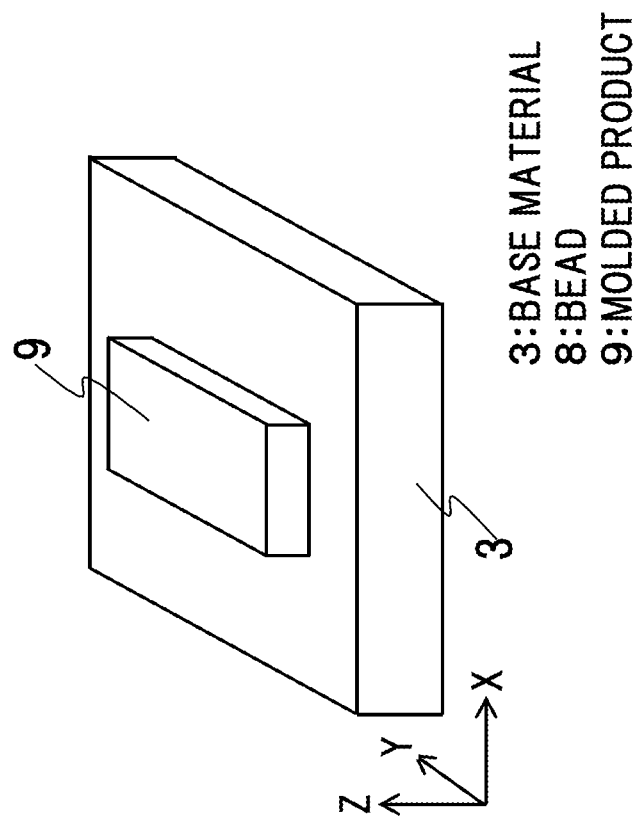

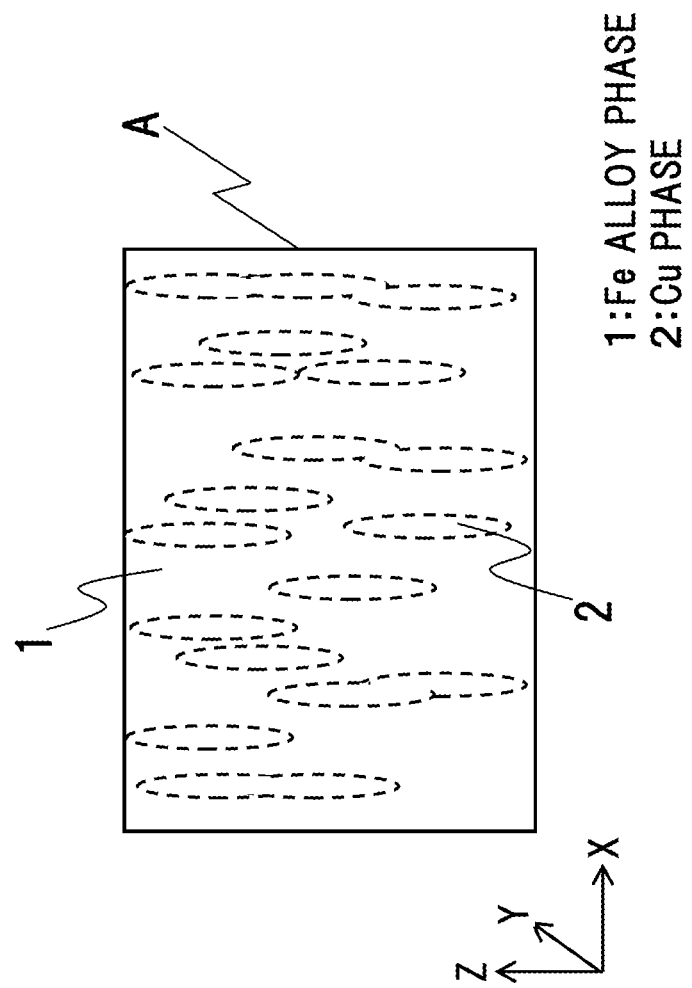

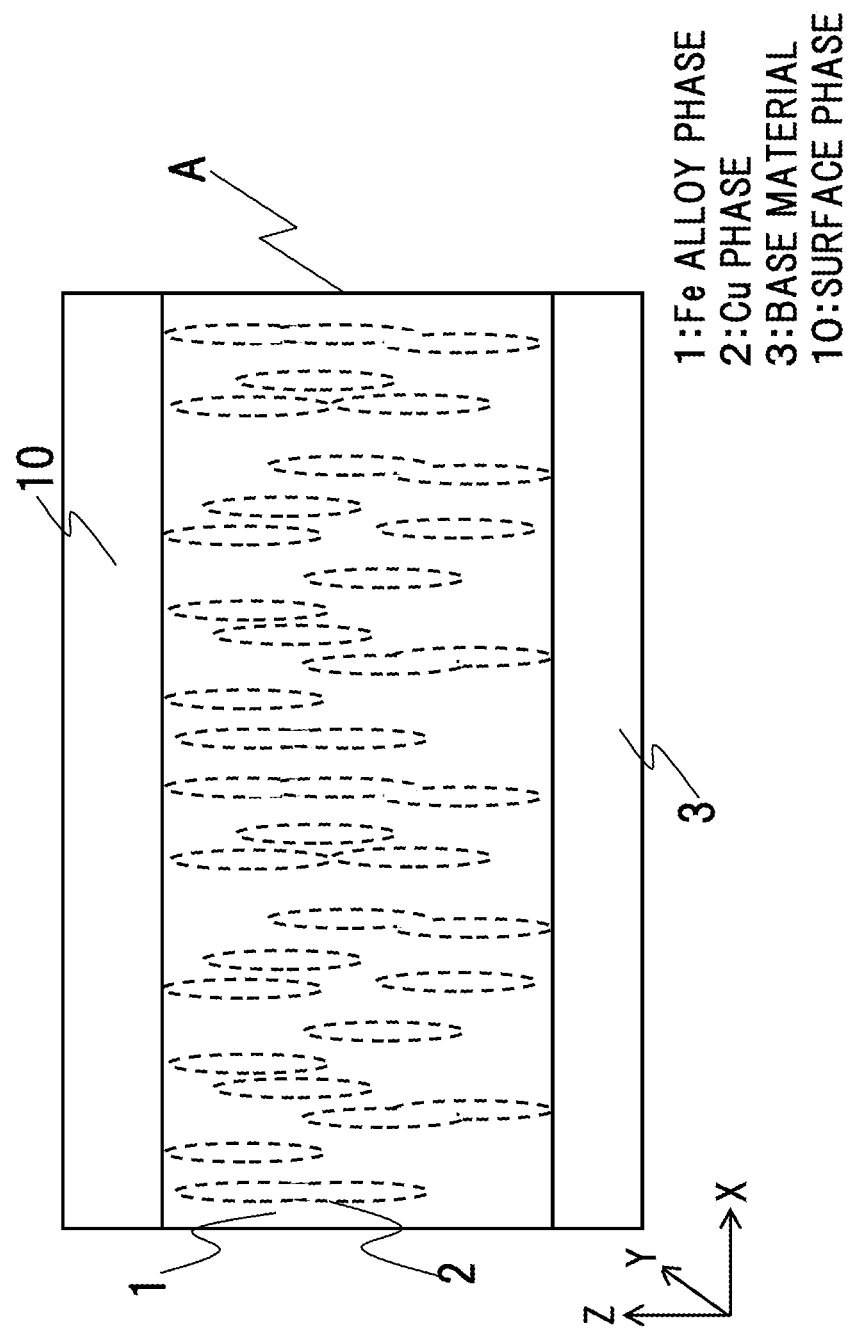

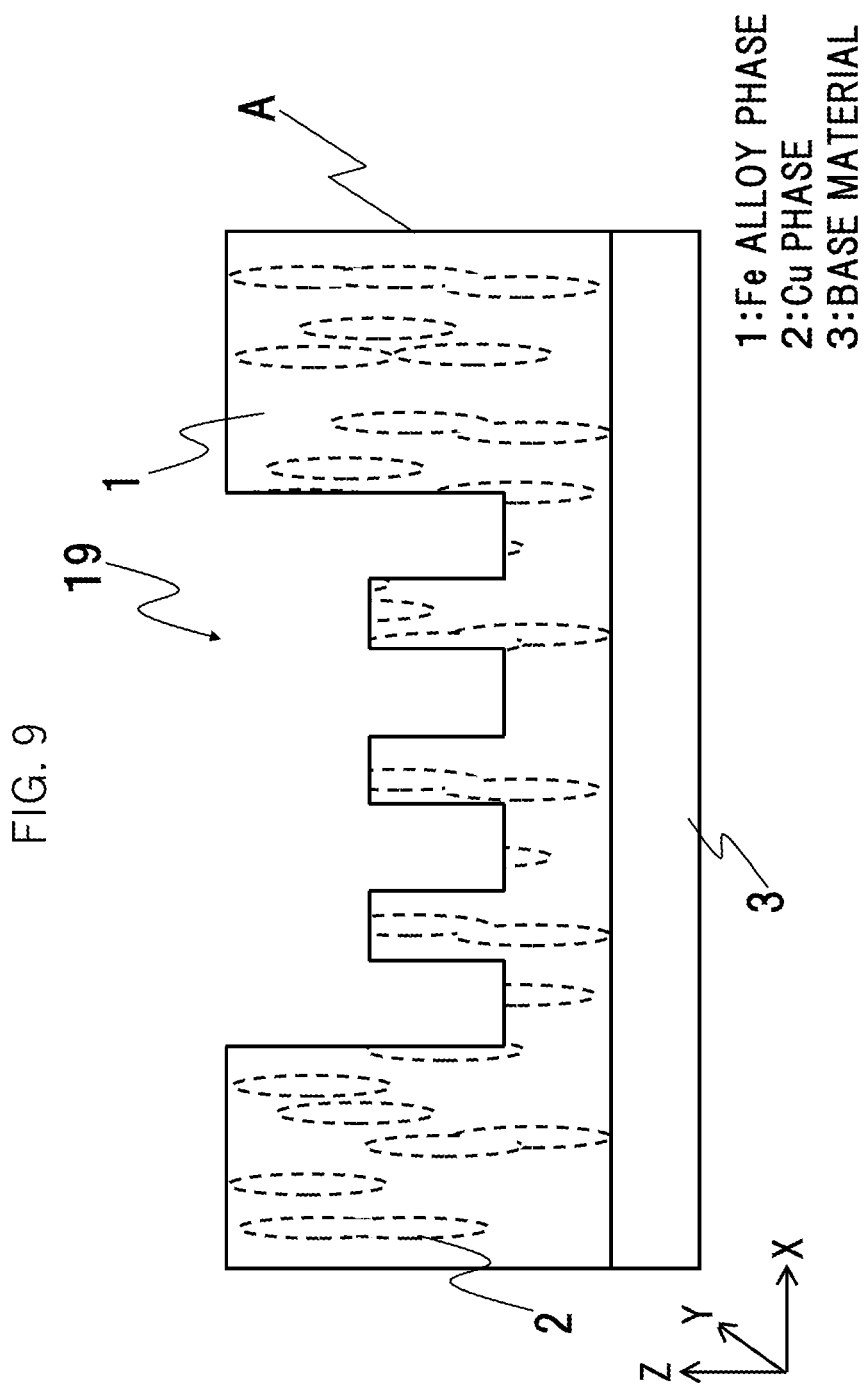

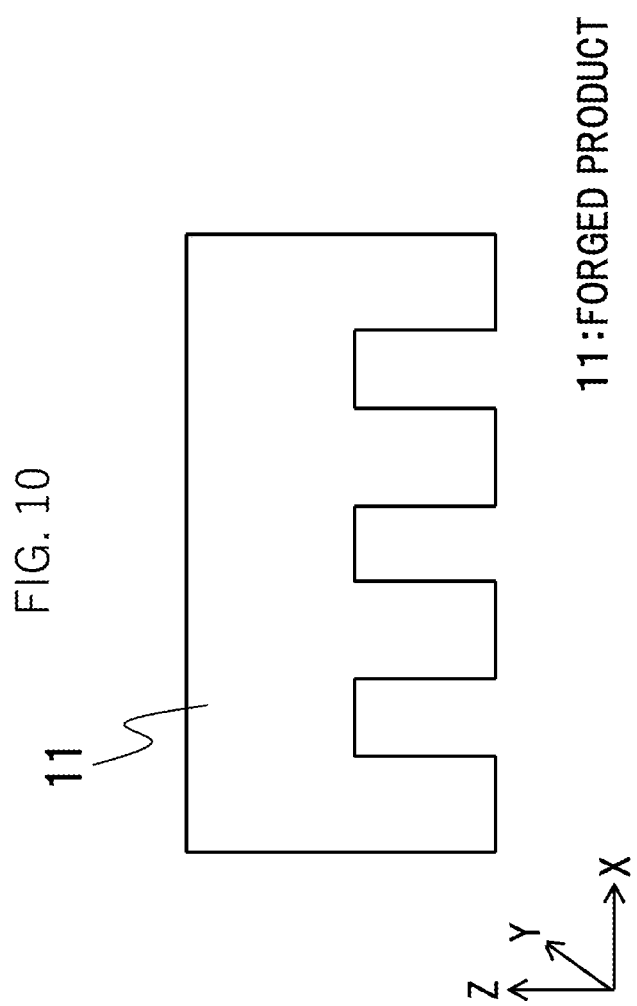

METHOD OF MOLDING ANISOTROPIC COMPOSITE MATERIAL AND DIE USING ANISOTROPIC COMPOSITE MATERIAL

BACKGROUND OF THE INVENTION

1. Field of the Invention

The present invention relates to a molding technique for an anisotropic composite material and a molded product such as a die using the anisotropic composite material.

2. Description of the Related Art

As one of lamination-molding techniques, there is exemplified laser lamination-molding (laser metal deposition: sometimes referred to as LMD).

JP 2016-211062 A is a cited document relating to laser lamination-molding. JP 2016-211062 A discloses a technique for manufacturing a composite material in which a Cu phase and an Fe alloy phase are mixed by controlling the molding order of a laminate product.

In the above-described LMD, in a case where a mixture of a Cu powder and an Fe alloy powder is used as a powder metal material, the molded product is in a state where independent phases are generated inside Cu and Fe alloy, respectively, and are mixed. In a case where the amount of the Cu powder is equal to or more than a certain value in the mixing ratio of the powder metal material, the state of the inside of the molded product may have a shape in which the Fe alloy phase surrounded by the Cu phase is scattered. In addition, in a case where the amount of the Cu powder is equal to or less than a certain value, the shape may be such that the Cu phase surrounded by the Fe alloy phase is scattered. In such a molded product, both the strength and the thermal conductivity are averaged.

JP 2016-211062 A does not refer to obtaining desired strength and thermal conductivity by allowing the strength and the thermal conductivity to have anisotropy.

SUMMARY OF THE INVENTION

The present invention is to provide a composite material in which anisotropy is provided to thermal conductivity by controlling a shape of a Cu phase scattered in an Fe alloy phase in a molded product.

In addition, the present invention is also to provide a die with improved accuracy and quality with respect to shape, strength, and the like.

According to one aspect of a method of molding an anisotropic composite material of the present invention, there is provided a method of molding a composite material by laser metal deposition in which a powder metal material is irradiated with a laser beam while supplying the powder metal material onto a surface of a base material, in which the powder metal material is a mixed powder of an Fe alloy powder and a Cu powder, and a mixing ratio of the Fe alloy powder and the Cu powder is 15% or more and 30% or less by weight % of the Cu powder, and in which the composite material having anisotropy is molded by setting energy of the laser beam to be 9 KJ/g or more and 10 KJ/g or less in a mixed powder ratio.

According to a typical embodiment of the present invention, it is possible to mold a molded product having desired strength and thermal conductivity by controlling a shape of a Cu phase surrounded by an Fe alloy phase.

BRIEF DESCRIPTION OF THE DRAWINGS

FIG. 1 is a cross-sectional view illustrating a configuration of a composite material according to a first embodiment of the present invention;

FIG. 2 is a cross-sectional view illustrating a configuration of a composite material according to a comparative example;

FIG. 3 is a diagram describing the principle of LMD;

FIG. 4 is a cross-sectional view illustrating a configuration of a composite material according to a comparative example;

FIG. 5 is a cross-sectional view illustrating a configuration of a composite material according to a comparative example;

FIG. 6A is a schematic view illustrating a laminate product molded by LMD;

FIG. 6B is a schematic view illustrating a laminate product molded by LMD;

FIG. 7 is a cross-sectional view of a composite material according to a second embodiment;

FIG. 8 is a cross-sectional view of a composite material according to a third embodiment;

FIG. 9 is a cross-sectional view illustrating an example of a die according to a fourth embodiment; and FIG. 10 is a cross-sectional view of a product forged with a die according to a fourth embodiment.

DETAILED DESCRIPTION OF THE PREFERRED EMBODIMENTS

Hereinafter, embodiments of the present invention will be described in detail with reference to the drawings. In addition, in all the drawings for describing the embodiments, the same portions are denoted by the same reference numerals in principle, and redundant description thereof will be omitted.

First, problems in the method of lamination-molding a composite material of Cu and Fe having no anisotropy will be described with reference to FIGS. 2 to 5.

[Problem (1)—Reduction of Heat Conduction]

FIG. 2 illustrates, as a comparative example with respect to the first embodiment, the shape of the cross section of the composite material A and the positional relationship of the laminate product at the time of performing lamination-molding by LMD. In addition, the directions in the description include the X direction, the Y direction, and the Z direction. The X direction and the Y direction are two perpendicular directions constituting a horizontal plane. The Z direction is the vertical direction.

FIG. 2 is a cross-sectional view of the molded product cut along a plane including the X direction and the Z direction. FIG. 2 illustrates a state where the amount of Cu is smaller (15% or less by weight %) than that of the first embodiment. The composite material A is configured with an Fe alloy phase 1 and a Cu phase 2.

FIG. 3 is a perspective view of a process of molding the composite material illustrated in FIG. 2. In the build-up molding, the base material 3 is irradiated with the laser beam 5 in the Z direction, and a laminate product is molded by mixing and supplying the Fe alloy powder 12 and the Cu powder 13.

As illustrated in FIG. 2, in a case where the amount of the Cu powder 13 is smaller than that of the Fe alloy powder 12, the Cu phase 2 is surrounded by the Fe alloy phase 1 having a lower thermal conductivity than the Cu phase 2, and the Cu phase 2 is circular. For the reason, the thermal conductivity of the molded product A is lower than the average value of the Fe alloy phase 1 and the Cu phase 2.

[Problem (2)—Decrease in Strength]

FIGS. 4 and 5 illustrate, as a comparative example with respect to the first embodiment, the shape of the cross section of the composite material A and the positional relationship of the laminate product at the time of performing lamination-molding by LMD. In addition, the directions in the description include the X direction, the Y direction, and the Z direction. The X direction and the Y direction are two perpendicular directions constituting a horizontal plane. The Z direction is the vertical direction.

FIGS. 4 and 5 are cross-sectional views cut along a plane including the X direction and the Z direction with respect to the molded product. FIGS. 4 and 5 illustrate a state where the amount of Cu is larger (35% or more by weight %) than that of the first embodiment. A composite material A is configured with an Fe alloy phase 1 and a Cu phase 2.

As illustrated in FIGS. 4 and 5, in a case where the amount of the Cu powder 13 is larger than that of the Fe alloy powder 12, the Fe alloy phase 1 is surrounded by the Cu phase 2 having a lower tensile strength. Therefore, the tensile strength of the molded product A is lower than the average value for the Fe alloy phase 1 and the Cu phase 2.

First Embodiment

The LMD will be described with reference to FIGS. 3, 6A, and 6B.

FIG. 3 is a schematic view illustrating the principle of a method of molding a laminate product by LMD, and FIGS. 6A and 6B are schematic views illustrating a laminate product molded by LMD.

The LMD is sometimes referred to as laser metal deposition, laser powder build-up, or the like. As illustrated in FIG. 3, in the LMD, the surface of the base material 3 is scanned by a laser head 4. At this time, the laser head 4 performs irradiation with the laser beam 5 while supplying a substance of an Fe alloy powder 12, a Cu powder 13, a gas, and the like which are powder metal materials (sometimes described as powder, metal, and the like). At the location which is irradiated with the laser beam 5, the base material 3, the powder metal, or the like is melted to form a melt pool 6.

As illustrated in FIG. 6A, beads 8 are formed by solidifying the melt pool 6. By repeating such processing for each layer, the beads 8 are accumulated on the surface of the base material 3, and thus, a structure is lamination-molded as a laminate product as illustrated in FIG. 6B.

A lamination molding device and method according to the first embodiment will be described with reference to FIGS. 1 and 3. The composite material according to the first embodiment is a composite material configured with an Fe alloy phase, a Cu phase, and a base material, and is a composite material forming an anisotropic shape, in which the Cu phase 2 is surrounded by the Fe alloy phase 1 and the amount of the Cu phase 2 becomes large in a direction perpendicular to the boundary surface of the base material 3 and the Fe alloy phase 1.

The composite material of FIG. 1 is manufactured by the manufacturing method of the material shape of the LMD illustrated in FIG. 3.

In the composite materials of the comparative examples illustrated in FIGS. 2, 4 and 5, at the time of molding, the Cu phase 2 is surrounded by the Fe alloy phase 1 without anisotropy, and thus, a decrease in thermal conductivity may occur. In addition, in a case where the Fe alloy phase 1 is surrounded by the Cu phase 2, the tensile strength may decrease.

On the other hand, in the composite material illustrated in FIG. 1, the shape of the Cu phase 2 surrounded by the Fe alloy phase 1 is allowed to have anisotropy, and the shape in which the amount of the Cu phase 2 becomes large in the Z direction is formed, so that the thermal conductivity differs between the X direction and the Z direction, and the thermal conductivity in the Z direction can be improved.

FIG. 1 is a cross-sectional view of the composite material according to the first embodiment, illustrating a state where the composite material is cut along a plane including the X direction and the Z direction. In FIG. 1, an Fe alloy phase 1, a Cu phase 2, and a base material 3 constituting a composite material A to be modeled are illustrated. The Cu phase 2 is surrounded by the Fe alloy phase 1 and has a shape that is large in the Z direction. The Cu phase 2 has a size of 1 to 100 µm.

The Fe alloy phase 1 is one of the materials forming the die, and the base material 3 is melted by a laser beam. In addition, the Fe alloy phase 1 and the Cu phase 2 are formed by mixing and supplying the Fe alloy powder 12 and the Cu powder 13 when the base material 3 is melted by the laser beam.

At this time, by mixing the Fe alloy powder 12 and the Cu powder 13 at the mixing ratio of the Fe alloy powder 12 and the Cu powder 13 in a range of 15% to 30% by weight % of the Cu powder 13, the shape of the Cu phase 2 becomes larger in the Z direction than in the X direction.

In order to allow the shape of the Cu phase 2 to become larger in the Z direction than in the X direction, that is, in order to obtain an anisotropic composite material having anisotropy, in addition to mixing the Fe alloy powder 12 and the Cu powder 13 at the mixing ratio of the Fe alloy powder 12 and the Cu powder 13 in a range of 15% or more and 30% or less (15% to 30%) by weight % of the Cu powder 13, the energy of the laser beam is set to be 9 KJ/g or more and 10 KJ/g or less (9 to 10 KJ/g) in a mixed powder ratio. KJ is kilojoules. This is because the anisotropy is obtained by melting the mixed powder of the Fe alloy powder 12 and the Cu powder 13.

For this reason, in the first embodiment, by setting the output of the laser beam to be 1800 W or more and 2000 W or less and by supplying the mixed powder of the Fe alloy powder 12 and the Cu powder 13 at 0.2 g/sec (12 g/min or more and 13 g/min or less), the supplied amounts of the Fe alloy powder 12 and the Cu powder 13 can be simultaneously melted in a case where the laser beam 5 melts the base material 3. This is because the shape of the Cu phase is three times or more the length in the Z direction with respect to the length in the X direction, and the thermal conductivity in the Z direction is to be set to be larger than the thermal conductivity in the X direction.

The output of the laser beam is controlled to be 9 to 10 KJ/g in a mixed powder ratio in order to form a molded product by melting the mixed powder and to be 50 J/mm$^2$ in order to bond the base material and the molded product.

The scanning speed of the laser is set to 1000 mm/min in order to set the energy for bonding the base material and the molded product to 50 J/mm$^2$.

As described above, according to the first embodiment, by setting the mixing ratio of the Fe alloy powder 12 and the Cu powder 13 to be 15% to 30% by weight % of the Cu powder 13 and setting the energy of the laser beam to be 9 to 10 KJ/g in the mixed powder ratio, it is possible to mold a composite material having anisotropy as illustrated in FIG. 1.

In addition, with respect to the molded composite material, it is possible to mold a molded product having required strength and desired thermal conductivity by changing the mixing ratio of the Fe alloy powder 12 and the Cu powder 13 in a predetermined range of 15% to 30% by weight % of the Cu powder 13.

Second Embodiment

A composite material and a molding method according to a second embodiment of the present invention will be described with reference to FIG. 7.

FIG. 7 is a cross-sectional view of the composite material according to the second embodiment, and FIG. 7 illustrates a state where the composite material is cut along a plane including the X direction and the Z direction. In FIG. 7, an Fe alloy phase 1 and a Cu phase 2 constituting a composite material (also referred to as a molded product) A to be molded are illustrated. The Cu phase 2 is surrounded by the Fe alloy phase 1 and has a shape that is large in the Z direction.

Unlike the first embodiment, the base material 3 for molding the Fe alloy phase 1 and the Cu phase 2 may not remain.

Third Embodiment

A lamination molding device and method according to a third embodiment of the present invention will be described with reference to FIG. 8.

FIG. 8 is a cross-sectional view of the composite material according to the third embodiment, illustrating a state where the composite material is cut along a plane including the X direction and the Z direction. In FIG. 8, an Fe alloy phase 1, a Cu phase 2, a base material 3, and a surface phase 10, which constitute a surface, of a composite material A to be molded are illustrated. The Cu phase 2 is surrounded by the Fe alloy phase 1 and has a shape that is large in the Z direction.

Unlike the first embodiment, the Fe alloy phase 1 and the Cu phase 2 are in contact with the surface phase 10 at a position opposite to the contact surface with the base material 3. The surface phase 10 may be molded on the surface of the Fe alloy phase 1 or joined to the Fe alloy phase 1.

Fourth Embodiment

A fourth embodiment of the present invention will be described with reference to FIGS. 9 and 10.

FIG. 9 illustrates a cross section of a die having an anisotropic composite material A molded according to the fourth embodiment. The composite material A is formed on an upper layer of a base material 3. In the composite material A, a Cu phase 2 is surrounded by an Fe alloy phase 1 and has a shape that is large in the Z direction. Accordingly, the Fe alloy phase 1 has high thermal conductivity in the Z direction which is the vertical direction, and thus, the Fe alloy phase 1 can also obtain high strength in the Z direction. A die 19 can obtain die characteristics such as high heat dissipation and high strength.

FIG. 10 is a diagram illustrating a forged product 11 manufactured by the die illustrated in FIG. 9. In FIG. 10, the forged product can be manufactured in a short time by the die having sufficient strength and high thermal conductivity.

As described above, according to the embodiment of the present invention, it is possible to mold a molded product made of a composite material having desired strength and thermal conductivity by controlling a shape of a Cu phase surrounded by an Fe alloy phase.

In addition, it is possible to manufacture a die having sufficient strength and high thermal conductivity by using the composite material according to the present embodiment.

What is claimed is:

1. A method of molding a composite material by laser metal deposition in which a powder metal material is irradiated with a laser beam while supplying the powder metal material onto a surface of a base material,
   wherein the powder metal material is a mixed powder of an Fe alloy powder and a Cu powder, and a mixing ratio of the Fe alloy powder and the Cu powder is 15% or more and 30% or less by weight % of the Cu powder, and
   wherein the composite material having anisotropy is molded by setting energy of the laser beam to be 9 KJ/g or more and 10 KJ/g or less in a mixed powder ratio and simultaneously melting the mixed powder to form a Cu phase and a Fe phase, so that a shape of the Cu phase becomes larger in the Z direction than in the X direction,
   wherein the base material and the molded composite material are bonded by setting the energy density of the laser to 50 J/mm$^2$, and
   wherein the Z direction is the vertical direction and the X direction and Y direction are two perpendicular directions constituting a horizontal plane.

2. The method according to claim 1, wherein an output of the laser beam is 1800 W or more and 2000 W or less.

3. The method according to claim 2, wherein the mixed powder is supplied at a rate of 12 g/min or more and 13 g/min or less.

4. The method according to claim 3, wherein a scanning speed of the laser beam with respect to the base material is 1000 mm/min.

* * * * *